Fig. 4

Aug. 7, 1962  A. N. ADDIE  3,048,452
TURBINE
Filed May 28, 1958  5 Sheets-Sheet 5
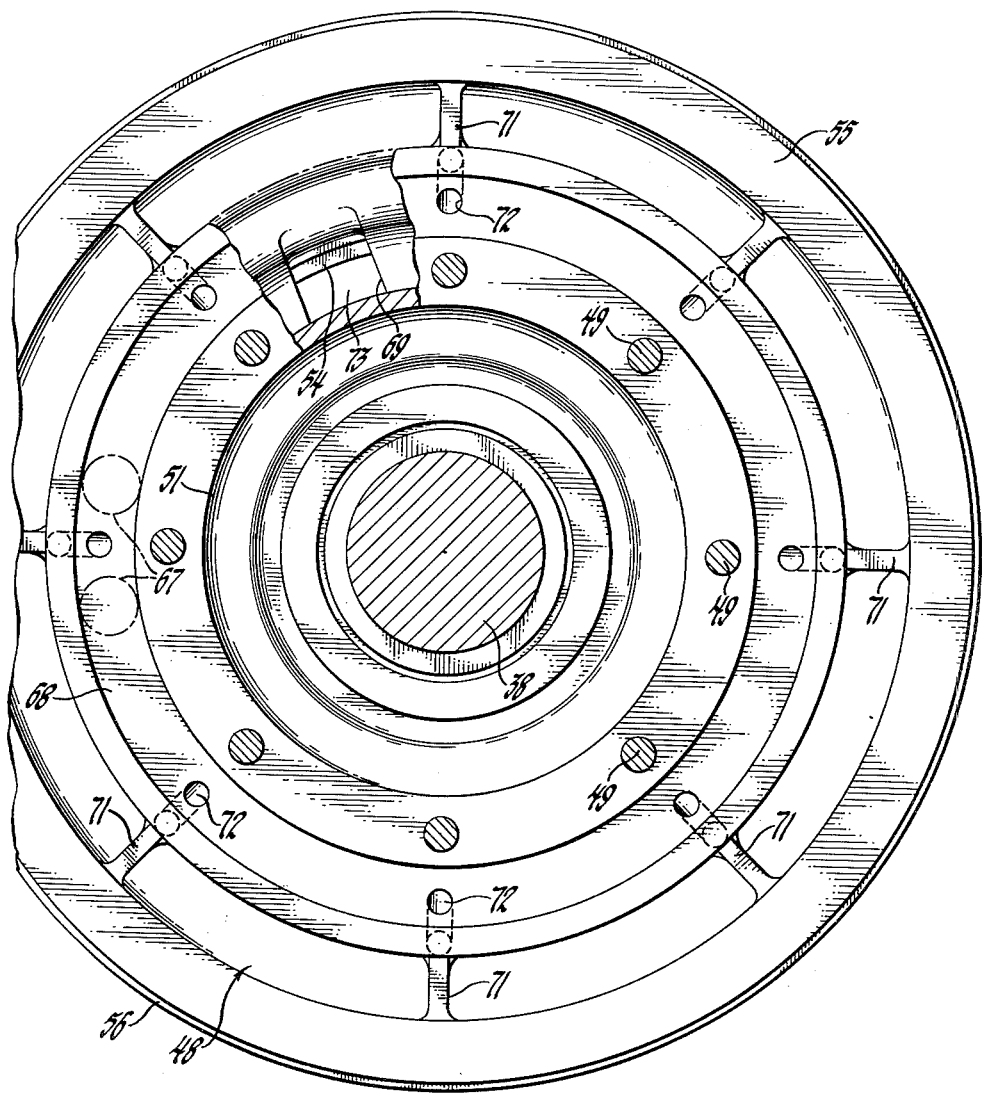
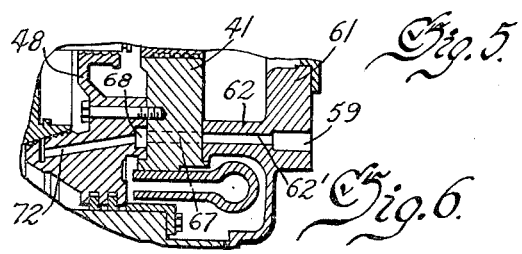
Fig. 5.
Fig. 6.
INVENTOR.
Albert N. Addie
BY
Paul Fitzpatrick
ATTORNEY

United States Patent Office 3,048,452  
Patented Aug. 7, 1962
::::

3,048,452
TURBINE
Albert N. Addie, La Grange Park, Ill., assignor to General Motors Corporation, Detroit, Mich., a corporation of Delaware
Filed May 28, 1958, Ser. No. 738,345
9 Claims. (Cl. 308—26)

My invention relates to turbines and particularly to the bearing supports and seals of a turbine. The invention is applicable to turbines or analogous machines of various types, but is particularly desirable in those which operate with relatively high temperature motive fluids.

The nature of the invention may be indicated generally by pointing out that it provides an improved bearing support for a turbine shaft which is tolerant of relative thermal expansion of the parts, which minimizes transmission of vibration from the rotor to the stationary structure, which accurately maintains concentricity of the rotor and stator and particularly of the relatively moving parts of labyrinth seals, and which includes novel provisions for cooling the turbine bearing support.

The nature of the invention will be clear to those skilled in the art from the succeeding detailed description of the preferred embodiment of the invention and the accompanying drawings thereof.

FIGURE 4 is a partial transverse sectional view taken substantially on the plane indicated by the line 4—4 in FIGURE 3, with parts cut away.

FIGURE 5 is a partial transverse sectional view, with parts cut away, taken substantially on the plane indicated by the line 5—5 in FIGURE 3.

FIGURE 6 is a partial sectional view taken in the plane indicated by the line 6—6 in FIG. 1.

Figure 2:
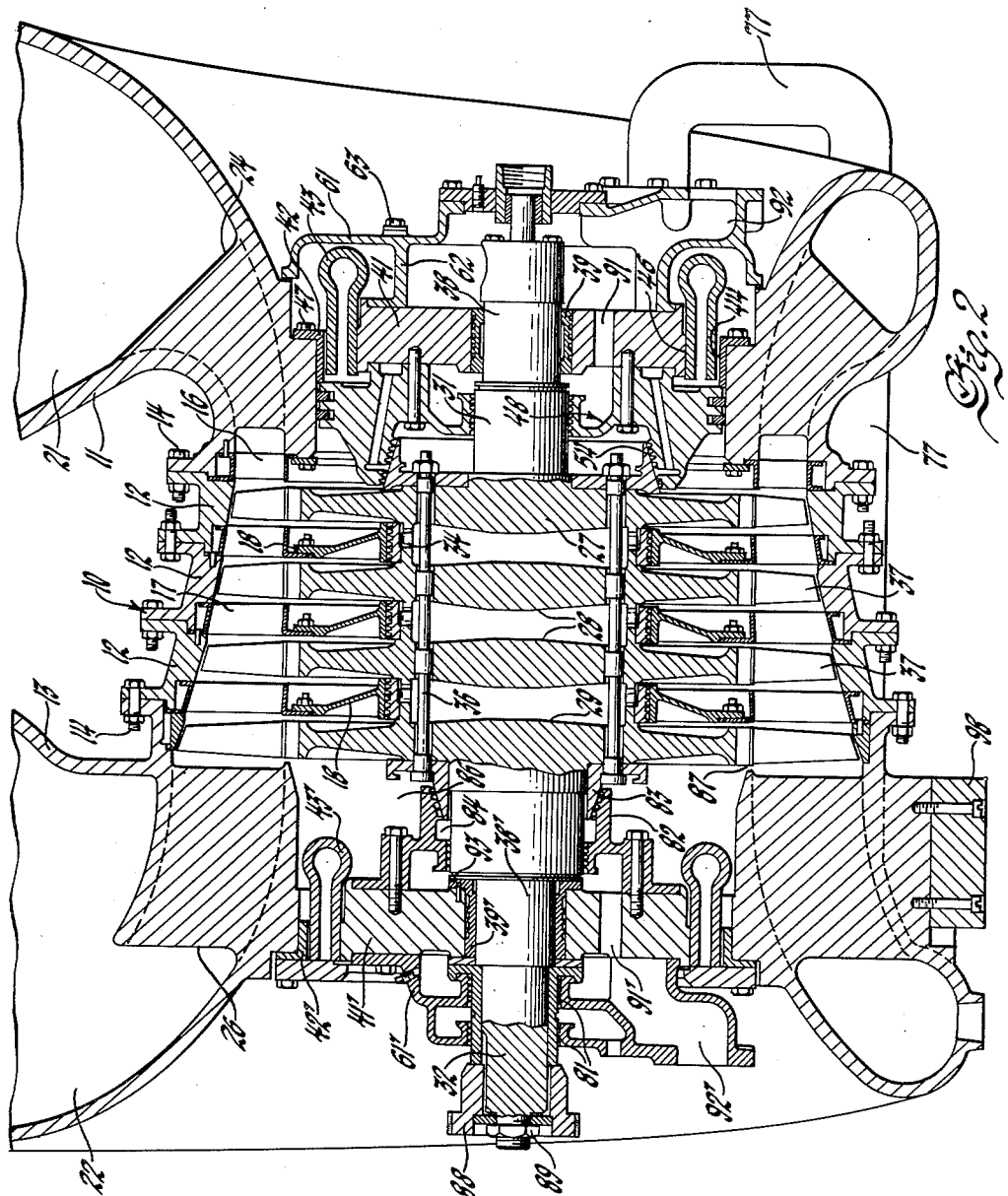
FIGURE 2 is a sectional view of the turbine taken on a plane containing the axis of rotation thereof, indicated by the line 2—2 in FIGURE 1.

It seems best to describe the structure of the turbine generally to set out the environment of the invention before proceeding to the structures which characterize the invention. Referring particularly to FIGURE 2, the turbine is a four-stage axial flow machine comprising a stator 10. The stator includes a case which consists of an inlet scroll and front bearing support casting 11, three case rings 12, and an outlet scroll and rear bearing support casting 13. The stator case sections 11, 12, and 13 include flanges with the aligning pilots fixed together by rings of bolts 14. The stator also includes a ring of first-stage nozzle vanes 16 and three lower stage nozzle vane rings 17. Diaphragms 18 are mounted on the inner shroud of the nozzle vane rings 17. Motive fluid, which may be steam or combustion products at elevated temperature and under pressure, is introduced through a flanged inlet 19 into the inlet scroll 21, pass through the stator, including the four stages of nozzle vanes, and exhaust into the outlet scroll 22, which has a flanged discharge connection 23. Struts 24 and 26 extend across the inlet and outlet passages.

The turbine also includes a rotor made up of a first stage disk 27, two intermediate stage disks 28 and a fourth stage disk 29. A shaft 31 is integral with the first stage disk and a shaft 32 is integral with the fourth stage disk. The disks are coupled together by face splines 34 on flanges extending from the disks and a ring of bolts 36. Rotor blades 37 are mounted on the disks 27, 28 and 29. The structure so far described may be regarded as conventional, at least so far as the present invention is concerned.

We may now consider the bearing support and sealing arrangement at the inlet end of the turbine embodying my invention. Shaft 31 includes a journal portion 38 mounted in a bearing 39, which is fixed in an inner bearing support ring 41. Inner ring 41 is supported within an outer ring 42 by a number of generally U-shaped single leaf springs 43, which may be characterized as hairpin springs. One end of each spring is welded to the ring 42 in the area indicated at 44 and the other end of each spring is welded to a flat 46 on the ring 41. Preferably there are 16 such springs. Approximately half of the straight portion of each leg of the spring, as well as the return bend of the spring, are out of contact with the two rings. While these springs are quite stiff so as to support the load of the rotor, they are capable of yielding to accommodate differential expansion of the case and the bearing support. As will be apparent, the inlet case varies between room temperature when the turbine has been out of service and a running temperature near that of the motive fluid. As a result, it has considerable thermal expansion, whereas the support 41 has a much smaller range of temperature and, therefore, of expansion.

The ring 42 is fixed to the inlet case by a ring of bolts 47. A stationary labyrinth seal ring 48 is fixed to the inner face of bearing support ring 41 by a ring of bolts 49. This seal ring includes a portion 51 which pilots into the inner support ring 41, a flange 52 which is internally ridged to provide a labyrinth oil seal against shaft 31, and a stationary labyrinth seal portion 53 which cooperates with a stepped rotating seal member 54 fixed to the first-stage disk 27 by the rotor bolts 36. Two piston ring seals 56 mounted in circumferential grooves in the rim portion 55 of ring 48 seal against the inner surface of the inlet case 11. These permit relative expansion of the parts while sealing against leakage of motive fluid.

Figure 3:
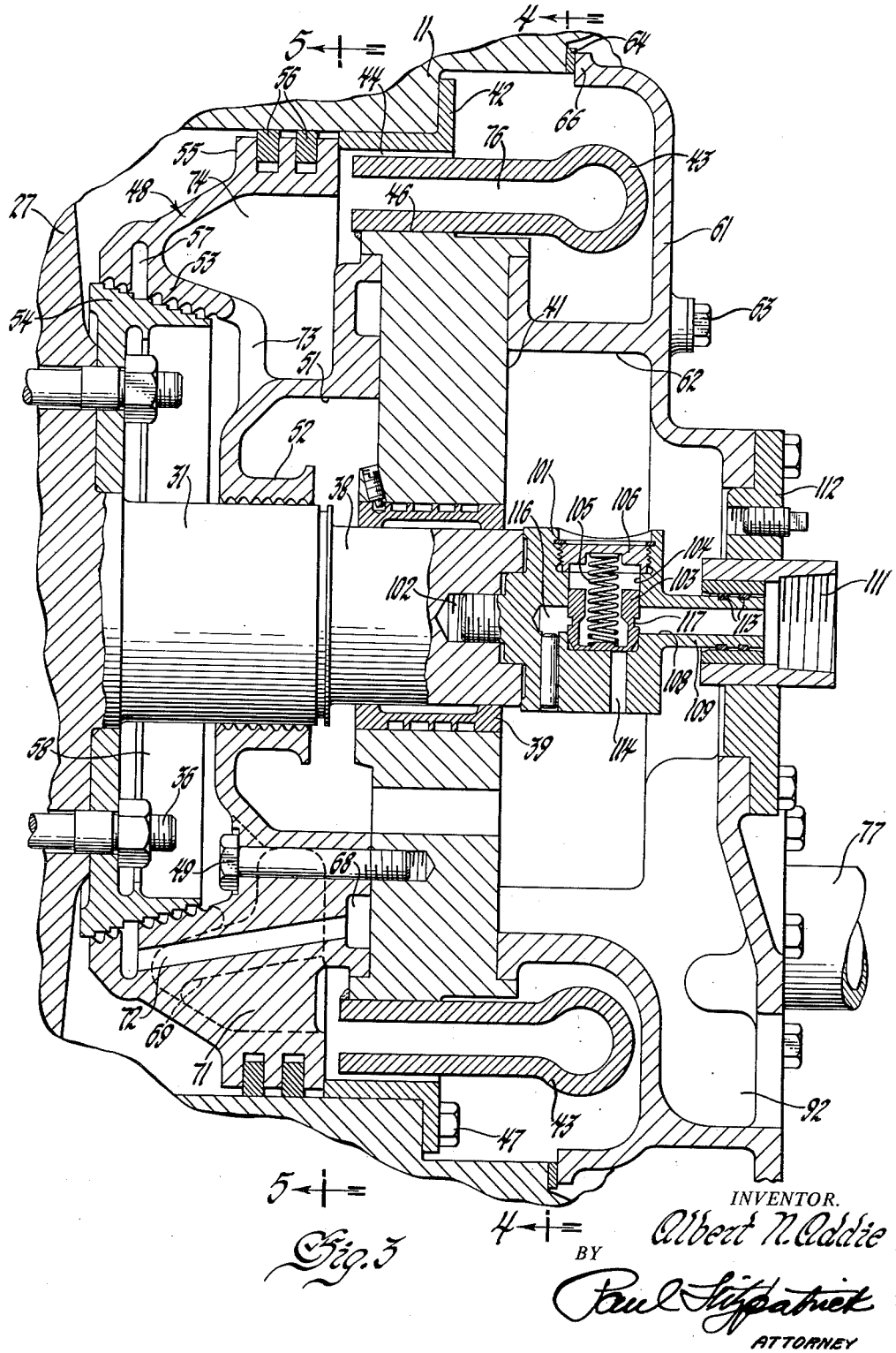
FIGURE 3 is an enlarged view similar to FIGURE 2 of the inlet end of the turbine.

Compressed air is supplied to an intermediate zone of the labyrinth seal defined by an annular recess 57 in the seal portion 53. This air is under somewhat higher pressure than the motive fluid. A part of the air leaks through the seal into the turbine and a part leaks toward the right, as shown in FIGURE 3, into a chamber 58 around the shaft.

Figure 4:
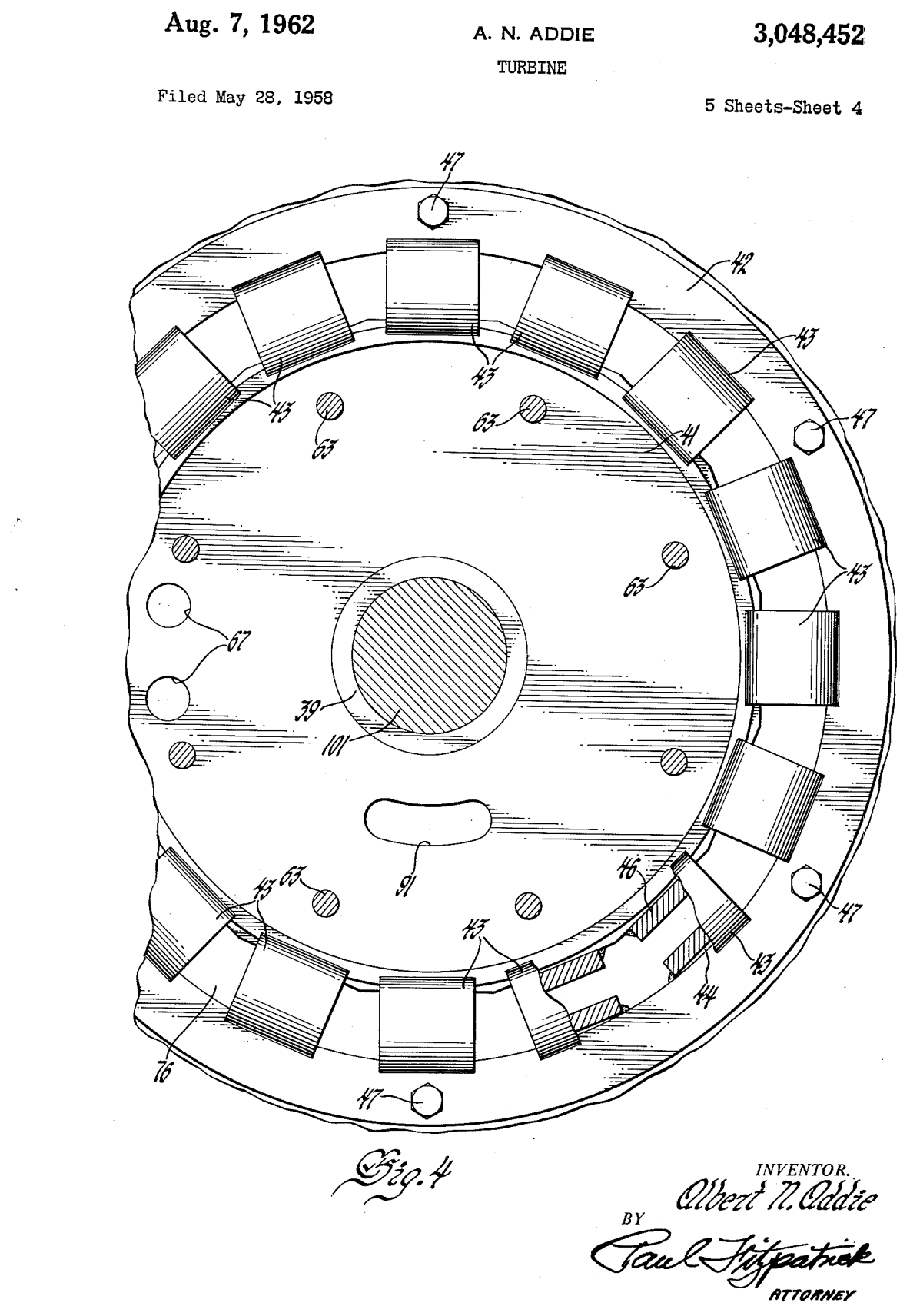

Air is supplied to the recess 57 through a compressed air line, not shown, which connects to an inlet 59 (FIG. 1) in an inlet end cover 61. The inlet end cover is a generally annular casting having a flange 62 which pilots into a recess in the outer face of ring 41. The cover is fixed to the ring 41 by a row of cap screws 63. A gasket 64 is mounted between the peripheral flange 66 of the cover and a shoulder on the inlet case 11. Flange 66 may move radially with respect to the case due to relative expansion of end cover 61 and inlet case 11. The air inlet 59 communicates through a passage 62′ in flange 62 and two drilled holes 67 (FIGURE 4) in the support ring 41 with an annular groove 68 in the outer face of flange 51 of seal ring 48. Flange 51 is connected by eight relatively heavy ribs 69 to the inner face of the seal ring and the outer surfaces of ribs 69 are connected by thin webs 71 to the outer flange 55 of ring 48. Eight drilled passages 72 in the webs 69 conduct the cooling and sealing air to the annular recess 57. Air leaking through the seal 53, 54 into the chamber 58 may pass through eight openings 73 in the seal ring between the webs 69 into the space 74 at the outer face of the seal ring, from which it discharges through the annular opening 76 between the outer and inner bearing support rings, flowing over the hairpin springs and the outer surface of the inner ring 41. The cooling air flows into the end cover 61 outside of flange 62 into a space from which it discharges through a pipe 77, the inlet end of which has a flange 78 bolted over an opening in the end cover and the outlet end of which has a flange 79 bolted over an opening in the exhaust scroll 22.

The bearing support structure at the exhaust end of the engine is similar to that at the inlet end, but the cooling arrangement is simpler. Since the pressure of the motive fluid is low at the exhaust end of the turbine and its temperature is much lower than at the inlet end, the sealing and cooling requirements are less rigorous. The shaft 32 (FIG. 2) has a journal 38' rotating in a bearing 39' mounted in an inner ring 41', supported by hairpin springs 43' in an outer ring 42' bolted to the exhaust case 13. An exhaust end cover 61' mounts oil seals 81 cooperating with the shaft 32. A labyrinth seal ring 82 fixed to the support ring 41' cooperates with the shaft 32 and with a seal ring 83 fixed to the turbine disk 29 by the bolts 36. Air may be conducted, by means not shown, to an annular recess 84 in the seal ring 82. The air which escapes between rings 82 and 83 flows through a space 86 between the rear turbine disk and the support ring 41', and into the turbine exhaust duct through the clearance 87 between the rear turbine disk and the exhaust case.

An externally splined coupling member 88 splined to shaft 32 is retained by a nut 89. Oil is supplied to the bearings 39 and 39' by means not illustrated. Oil flowing from the inner ends of the bearings may escape through drain passages 91 and 91' in the inner bearing support rings and through outlets 92 and 92' in the end covers. Bearing 39' includes a flange 93 which is the turbine thrust bearing.

Figure 1:
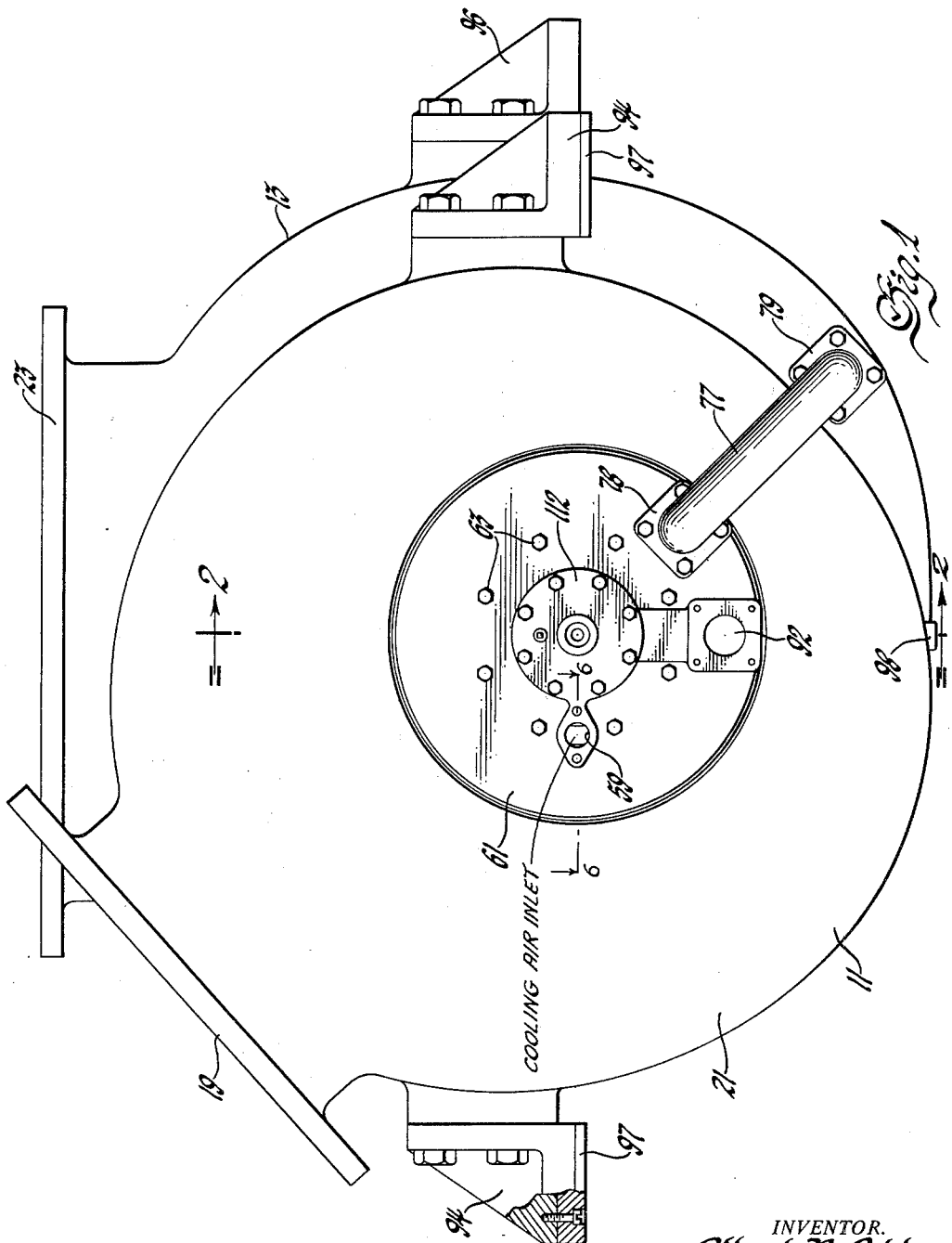
FIGURE 1 is an elevation view of a turbine viewed from the inlet end.

Referring to FIGURE 1, the turbine may be supported by two pads or brackets 94 bolted to the inlet case 11 and two pads 96 (only one of which is illustrated), bolted to the outlet case 13. Ribs or keys 97 extending radially of the turbine are provided on the undersurface of pads 94. A key 98 extending axially of the turbine is bolted to the underside of the exhaust case. These supporting and guiding members provide for support of the turbine and location thereof and allow for expansion of the case.

The turbine also includes an overspeed or emergency governor control device mounted in a housing 101 (FIG. 3) threaded into the end of shaft 31 at 102. This device includes a valve plug 103 seated in a radial bore 104 in the housing 101 and normally held seated by compression spring 105 retained by a cap 106 threaded into the bore 104. Bore 104 intersects an axial bore 108 which extends through a stub shaft 109 projecting from the valve housing 101. Stub shaft 109 is rotatable in a control oil inlet 111 mounted in a plate 112 bolted to the end plate 61. When the turbine is in operation, oil pressure is supplied to the inlet 111. Seals 113 are provided between the inlet and stub shaft 109. When valve 103 is seated, oil pressure is in the inlet 111 and any control line leading to its is maintained. The plug 103 is slightly unbalanced so that it will lift against the resistance of spring 105 to open the valve upon a predetermined overspeed. When this occurs, the control oil is bled through an outlet passage 114.

In order to balance the side thrust of the oil on the valve plug 103, bore 108 is continued at 116 on the other side of the bore 104. This is a blind passage. An annular groove 117 in the valve plug equalizes the pressure on the opposite sides of the plug.

It will be apparent from the foregoing that the invention provides a particularly desirable bearing support and seal arrangement for a high temperature turbine. The springs permit relative expansion of the hot inlet case and the relatively cool bearing support. The manner in which the seal leakage air is conducted over the bearing support and particularly the springs 43 cools the structure to a very worthwhile extent. The springs 43 create a long heat flow path of small area between the outer ring 42 and inner ring 41, minimizing conduction of heat to the inner ring. Since the labyrinth seal structure is supported on the inner ring, it is held in close concentricity to the rotor, not withstanding relative expansion or vibration.

The detailed description of the preferred embodiment of the invention for the purpose of explaining the principles thereof is not to be construed as limiting the invention, as many modifications may be made by the exercise of skill in the art.

I claim:

1. In a turbomachine comprising a case and a rotor within the case; a bearing for the rotor; a support for the bearing mounted in the case comprising an outer ring connected to the case, and inner ring mounting the bearing, and a plurality of hairpin springs spaced around the rings fixed to and between the rings; a labyrinth seal adjacent the bearing comprising a part of the rotor and a stationary part mounted on the inner ring; means for supplying compressed air to a zone of the seal intermediate the ends thereof; and means for conducting the air leaking from the seal past the hairpin springs to cool the springs.

2. In a turbomachine comprising a case and a rotor within the case; bearings for the rotor at each end thereof; a support for each bearing mounted in the case comprising an outer ring connected to the case, an inner ring mounting the bearing, and a plurality of hairpin springs spaced around the rings fixed to and between the rings; a labyrinth seal adjacent each bearing comprising a part of the rotor and a stationary part mounted on the inner ring; means for supplying compressed air to a zone of the seal intermediate the ends thereof; and means for conducting the air leaking from the seal past the hairpin springs to cool the springs.

3. In a turbomachine comprising a case and a rotor within the case, a bearing for the rotor; a support for the bearing mounted in the case comprising an outer ring connected to the case, an inner ring mounting the bearing, and a plurality of hairpin springs spaced around the rings fixed to and between the rings; a labyrinth seal adjacent the bearing comprising a part of the rotor and a stationary part mounted on the inner ring; means for supplying compressed air to a zone of the seal intermediate the ends thereof; and means for conducting the air leaking from the seal between the rings past the hairpin springs to cool the springs and the inner ring.

4. In a turbomachine comprising a case and a rotor within the case; a bearing for the rotor; a support for the bearing comprising an outer ring fixed to the case, an inner ring mounting the bearing and spaced from the outer ring to define an annular gap between the rings, and a number of hairpin springs spaced around the rings, each spring having two legs generally parallel to the axis of the rotor, one leg being fixed to each ring; and end cover fixed to the inner ring and engaging the case with freedom for relative radial movement; a labyrinth seal between the bearing and the support comprising a part of the rotor and a stationary part mounted on the inner ring; and a seal between the stationary part and the case providing for relative radial movement.

5. In a turbomachine comprising a case and a rotor within the case; a bearing for the rotor; a support for the bearing comprising an outer ring fixed to the case, an inner ring mounting the bearing and spaced from the outer ring to define an annular gap between the rings, and means supporting the inner ring on the outer ring with freedom for relative radial expansion; an end cover fixed to the inner ring and engaging the case with freedom for relative radial movement; a labyrinth seal between the bearing and the support comprising a part of the rotor and a stationary part mounted on the inner ring; a seal between the stationary part and the case providing for relative radial movement; the end cover, inner ring, and stationary part defining connecting passages for cooling and sealing air under pressure discharging into the seal intermediate the ends thereof; the stationary part defining passages therethrough for flow of the said air leaking from the seal to the said gap between the rings; and the end cover defining an outlet for the said air.

6. In a turbomachine comprising a case and a rotor within the case; a bearing for the rotor; a support for the bearing comprising an outer ring fixed to the case, an inner ring mounting the bearing and spaced from the outer ring to define an annular gap between the rings, and a number of hairpin springs spaced around the rings, each spring having two legs generally parallel to the axis of the rotor, one leg being fixed to each ring; an end cover fixed to the inner ring and engaging the case with freedom for relative radial movement; a labyrinth seal between the bearing and the support comprising a part of the rotor and a stationary part mounted on the inner ring; a seal between the stationary part and the case providing for relative radial movement; the end cover, inner ring, and stationary part defining connecting passages for cooling and sealing air under pressure discharging into the seal intermediate the ends thereof; the stationary part defining passages therethrough for flow of the said air leaking from the seal to the said gap between the rings; and the end cover defining an outlet for the said air.

7. In a turbomachine comprising a case and a rotor within the case: the combination of a bearing for the rotor and a support for the bearing mounted in the case comprising an outer ring connected to the case, an inner ring substantially coplanar to the outer ring mounting the bearing, and a plurality of hairpin springs spaced around the rings rigidly fixed to the rings and extending between the rings, the springs being sufficiently stiff to locate closely the axis of the bearing while allowing relative radial expansion of the said rings.

8. In a turbomachine comprising a case and a rotor within the case: the combination of a bearing for the rotor and a support for the bearing comprising an outer ring fixed to the case, an inner ring mounting the bearing and spaced from the outer ring to define an annular gap between the rings, and a number of hairpin springs spaced around the rings, each spring having two legs generally parallel to the axis of the rotor, one leg being rigidly fixed to each ring; the springs being sufficiently stiff to locate closely the axis of the bearing while allowing relative radial expansion of the said rings.

9. A combination as recited in claim 8, the inner and outer rings being substantially concentric.

References Cited in the file of this patent

UNITED STATES PATENTS

| | | |
|---|---|---|
| 575,481 | Kimball | Jan. 19, 1897 |
| 633,476 | Northam | Sept. 19, 1899 |
| 726,259 | Culver | Apr. 28, 1903 |
| 837,850 | Kolb | Dec. 4, 1906 |
| 1,060,000 | Jorgensen | Apr. 29, 1913 |
| 1,527,635 | Doran | Feb. 24, 1925 |
| 1,900,128 | Persons | Mar. 7, 1933 |
| 1,946,993 | Trumpler | Feb. 13, 1934 |
| 2,282,894 | Sheldon | May 12, 1942 |
| 2,429,936 | Kenny et al. | Oct. 28, 1947 |
| 2,602,009 | Barlow et al. | July 1, 1952 |
| 2,631,901 | Holben et al. | Mar. 17, 1953 |
| 2,698,772 | Roberts | Jan. 4, 1955 |
| 2,709,567 | Wood | May 31, 1955 |
| 2,820,652 | Oechslin | Jan. 21, 1958 |
| 2,829,014 | May | Apr. 1, 1958 |
| 2,927,825 | Stone | Mar. 8, 1960 |

FOREIGN PATENTS

| | | |
|---|---|---|
| 612,132 | Great Britain | Nov. 9, 1948 |